United States Patent [19]

Hekimian et al.

[11] Patent Number: 4,833,675
[45] Date of Patent: May 23, 1989

[54] PCM FRAME SLIP DETECTION IN A CHANNEL

[75] Inventors: Norris C. Hekimian, Potomac, Md.; James F. Ingle, Fair Haven, N.J.

[73] Assignees: Hekimian Laboratories, Inc., Gaithersburg, Md.; Bell Communications Research, Inc., Livingston, N.J.

[21] Appl. No.: 57,281

[22] Filed: Jun. 2, 1987

[51] Int. Cl.[4] ............................................. H04J 3/06
[52] U.S. Cl. .................................... 370/100; 375/118
[58] Field of Search ......................... 370/100, 13, 17; 375/118

[56] References Cited

U.S. PATENT DOCUMENTS 4,158,107 6/1979 Nicholas .............................. 370/100
4,320,516 3/1982 Kammerlander ................... 375/118
4,328,587 5/1982 Mizuno ............................... 375/118

Primary Examiner—Douglas W. Olms
Attorney, Agent, or Firm—Brumbaugh, Graves, Donohue & Raymond

[57] ABSTRACT

In the particular embodiment of the invention described in the specification, a frame slip detector for a detecting frame slip in a 24 channel PCM transmission system using an 8 KHz frame rate supplies a 1 KHz test tone to one channel of the system. A phase shift detector detects phase shifts in the same channel and supplies them to a frame slip indicator which responds to phase shift signals within the range from 40 degrees to 50 degrees which recur at periodic intervals of at least one second and supplies corresponding indications of frame slip for each phase shift detected.

6 Claims, 1 Drawing Sheet

PCM FRAME SLIP DETECTION IN A CHANNEL

BACKGROUND OF THE INVENTION

This invention relates to pulse code modulation (PCM) frame slip detection and, more particularly, to an arrangement for detecting the occurrence of a PCM frame slip solely within a single voice channel in contrast to the customary detection of frame slip by comparision of PCM bit stream rates.

In the most common PCM transmission system, each voiceband customer signal is sampled at a frame rate of 8,000 times per second and each sample is encoded into eight bits. These eight-bit samples of 24 customer channels plus a single frame bit are combined into a 193 bit frame format lasting 1/8,000 second or 125 microseconds. The resulting bit rate thus is $193 \times 8,000 = 1,544,000$ bits per second or, equivalently, 1.544 megabits per second (Mb/s). Although the details of the frame structure may be different for various PCM systems throughout the world, the channel frame rate of 8,000 per second is observed almost universally, i.e., the incidence of other than 125 microsecond frame duration is almost inconsequential.

Whereas a connection with digital carriers and multiple digital switches all of which have perfectly synchronized bit streams will show no evidence of frame slip, (i.e., repetition or deletion of a full 125 microsecond frame of data), it has been found that a slight lack of synchrony (and the slips which result) is not detrimental to voice traffic in a PCM channel. Moreover, elimination of synchronization equipment represents an element of cost saving at no apparent penalty to the typical voice customer. However, the effect of even a single frame slip on the transmission of digital data over the voice channel by data modems may be devastating insofar as data errors are produced. To see how this arises, it is necessary to note how asynchrony between the received PCM stream and the local PCM receiver are handled.

If we assume that both the incoming PCM rate and the PCM receiver clock rate are within the established standards, they will differ by only a slight amount with one running relatively faster than the other. Should the incoming PCM signal rate exceed the receiver clock rate, at periodic intervals related to the difference in the rates a whole 125 microsecond frame will have to be deleted in the channel in order to coordinate to incoming signals with the clock at the receiver. On the other hand, should the receiver clock rate exceed the incoming PCM signal rate, at periodic intervals there will be no new and valid PCM sample to be offered to the receiver. At those times, it is again impossible to materialize a proper input because of a frame slip. In those circumstances, it is customary for the PCM receiver to retain and repeat the previous frame's data for use as the missing data. This results in an apparent time stretch of 125 microseconds. As said before, the effect of such "controlled" slips, as they are known, is of no consequence on voice traffic but may be very serious to data traffic. Such a slip-induced 125 microsecond shift in the sampling times in the modem receiver will cause numerous errors until the timing circuit recovers.

Various techniques have been used to identify a slip at the 1.544 Mb/s pulse rate, using external test equipment or equipment which receives the 1.544 Mb/s pulse stream and compares it to a reference clock rate, such as a digital switch clock rate. None of these conventional techniques, however, allows a customer whose signal is confined to one of the voice channels, and who typically does not have access to the 1.544 Mb/s bit stream, to identify that a controlled slip has occurred. Moreover, this controlled slip may occur in an interior portion of the total transmission system so that the end user has no means available to detect slip in the PCM portion.

SUMMARY OF THE INVENTION

Accordingly, it is an object of the present invention to provide a new and improved PCM frame slip detection system which is capable of detecting a frame slip within a single voice channel without reference to any other information in a PCM bit stream.

Another object of the invention is to provide a PCM frame slip detection system which is capable of detecting a frame slip in a signal after it has left the PCM portion of a transmission system.

These and other objects of the invention are attained by providing a phase shift detector to detect phase shifts in the received signal and select those phase shifts within a narrow range of phase angles corresponding to the ratio of the frequency of a test tone being used to test the system and the frame transmission rate of the system. In a particular embodiment using a clock rate of 1.544 megahertz (MHz) and a frame rate of 8 kilohertz (KHz), a 1 KHz test tone produces a phase shift at an angle of $+45$ degrees whenever a positive frame slip (repetition of a frame) occurs and a phase shift at an angle of $-45$ degrees whenever a negative frame slip (deletion of a frame) occurs. In actual practice, a tone a few Hertz higher than 1000 Hz such as 1004 Hz is used to avoid synchrony of sampling with the 8000 Hz sampling rate.

Accordingly, a frame slip indicator is set to respond to phase shift signals received from the phase shift detector having phase shift angles in a narrow window centered on 45 degrees, such as between 40 and 50 degrees, to produce an indication of a frame slip each time the phase shift detector detects a phase shift having an angle within that window. Since a frame slip in a 1.544 Mb/s bit stream will cause a slip in all 24 channels, detection of a slip in one channel is sufficient to identify that a frame slip has occurred in the 1.544 Mb/s bit stream.

BRIEF DESCRIPTION OF THE DRAWINGS

Further objects and advantages of the invention will be apparent from a reading of the following description of a typical embodiment of the invention in conjunction with the accompanying drawings in which.

DESCRIPTION OF THE PREFERRED EMBODIMENT

Figure 1:
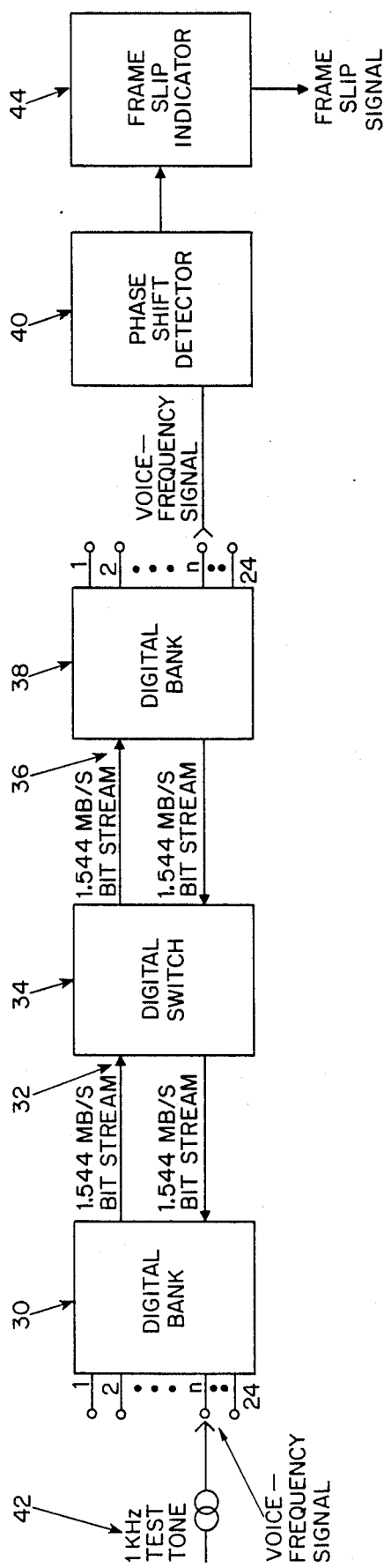
FIG. 1 is a schematic block diagram illustrating the arrangement of a representative system for detecting frame slip in a voice channel of a PCM transmission system in accordance with the invention.

In the representative system for detecting frame slip in a PCM voice channel illustrated in FIG. 1, a 24 channel digital bank 30 having an internal crystal controlled clock creates a 1.544 Mb/s digital bit stream 32 from 24 separate customer lines designated 1 . . . n . . . 24. The bit stream 32 is transmitted to a digital switch 34 which has its own internal clock governed by a crystal (or an external source) nominally operating at the same 1.544 Mb/s rate. Any difference between the sampling rate of the clock in the digital switch 34 and that in the digital bank 30 causes the switch 34 to insert controlled frame slips into the digital bit stream. The frame slips will occur at a rate equal to the difference in the frequencies of the two crystals as divided down to produce the frame or sampling rate of nominally 8,000 per second. A 1.544 Mb/s bit stream 36 from the digital swtich 34 passes on to a 24 channel digital bank 38 which supplies 24 separate voice channel signals to 24 corresponding customer lines 1'... n'... 24' for distribution of the signals to separate customers.

If the digital bank 30 were forced into synchronism with the digital switch 34 by external means, such as loop timing, there would be no frame slip in the bit stream 36 leaving the digital switch. On the other hand, as is frequently the case, if the digital bank 30 is not forced into synchronism with the digital switch 34 by external means, then the clock in the switch 34 can have a different frequency from the clock in the bank 30 which determines the sample rate for the 24 channels in the system. This difference in frequency forces the digital switch 34 to insert controlled frame slips which appear in the bit stream 36 transmitted from the switch 34 to the digital bank 38. For example, such frame slips will occur at a rate of one every 10 seconds if the two bit stream clock rates differ by 193/10=19.3 Hertz.

In order to detect such frame slips in one of the channels of the output from the digital bank 38 in accordance with the invention, a conventional phase shift detector 40 responsive to voice frequency signals is connected to one of the voice lines, designated n' in the illustrated example, in the output of the digital bank 38 and a test tone 42 of approximately 1 KHz is supplied to the corresponding channel n at the input to the digital bank 30. The phase shift detector 40 can be of any conventional type and may, for example, satisfy the requirements set forth in Section 4.4.4 of the ANSI/IEEE Standard 743-1984, "IEEE Standard Methods and Equipment for Measuring the Transmission Characteristics of Analog Voice Frequency Circuits", November, 1984. This standard puts bounds on the frequency of the "1 KHz" holding tone of 990 Hz to 1020 Hz.

The output of the phase shift detector 40 is a signal having a magnitude corresponding to the angle of the phase shift. In order to select only those phase shifts corresponding to a frame slip, the system is arranged to respond to phase shift signals only within a narrow phase angle range embracing the phase shift angle corresponding to a frame slip. For this purpose, a frame slip indicator 44 is arranged to respond whenever it receives a signal from the phase shift detector having a magnitude corresponding to a phase shift of at least 40 degrees but no more than 50 degrees.

Conventional equipment can detect whether a phase shift exceeding a preset threshold occurs on a 1 KHz test tone. In accordance with the invention, the frame slip indicator 44 may utilize such equipment to register a count if a phase shift (positive or negative) occurs in a narrow window around 45 degrees, such as 40 to 50 degrees.

Figure 2:
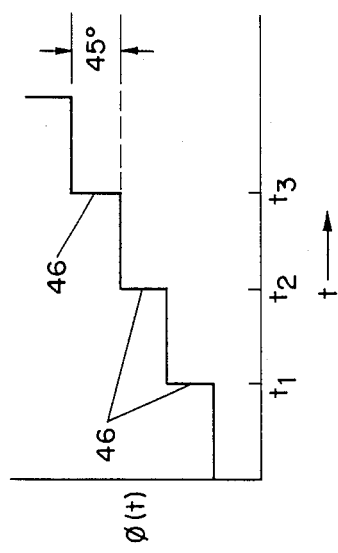
FIG. 2 is a graphical representation of the change, in the phase of a test tone each time a frame is repeated, or "slipped", in a system of the type shown in FIG. 1.

With this arrangement, each time a frame is repeated, a phase change occurs in the signal in the channel n from the bank 38 and the magnitude of the phase change is equal to the ratio of the test tone frequency to the frame rate multiplied by 360 degrees. For example, if a 1004 Hz test tone is used, the ratio 1004/8000 is 0.1255 which when multiplied by 360 gives 45.18 degrees. This is illustrated in FIG. 2, which is a graphical representation of the phase 0 of the received signal as a function of time, showing an ascending staircase of approximately 45 degree phase jumps 46 at times $t_1$, $t_2$ and $t_3$, i.e., each time a frame is repeated. If the received frame rate is faster than 8 KHz, the receiver will delete a frame periodically and the change in phase will be in the opposite direction from that shown in FIG. 2 and will be represented by a descending staircase of phase jumps.

Since phase shifts exceeding the lower limit of the window, i.e., 40 degrees, could occur on radio facilities which might be connected in tandem with a PCM transmission facility, it is not sufficient in such systems to know that a phase shift of 40 degrees magnitude or more had occurred. In PCM systems, however, there are no other phenomena, such as quantizing noise, impulse noise, out-of-frames or digital bit stream errors which can cause repeated phase jumps of nominally 45 degrees. In practice, using a window about 45 degrees which is to narrow will prove unusable and impractical because of the inescapable effects of quantizing noise present at the time of encoding or decoding of the test tone, the effects of occasional random bit errors in the PCM system, imperfections in the test tone itself, and the inevitable PCM quantization errors at encoding. As a result, a window having a range of about 40 to 50 degrees is deemed practical.

Since all phase jitter and phase shift measurements are made relative to a local tracking replica (or phase locked loop), the long-term or steady-state error will decay towards zero. This means that the effect of a true phase step will be evidenced as jump followed by a slow return to zero. Accordingly, it is also necessary for the frame slip indicator 44 to determine that the time trajectory of the phase parameter has entered this window from below the lower threshold (40 degrees) and did not exceed the upper threshold (50 degrees) before again dropping below the lower threshold.

It should be noted, that when frame slips occur, it should be as a result of asychronism between two relatively stable clocks. In PCM systems the absolute value of the maximum frequency error at 1.544 Mb/s is 100 Hz. Consequently, if system standards are met, the worst-case clock frequency difference is 100 Hz. If frame slip occurs at the maximum rate of 100 Hz, the minimum time interval between such slips is $$\frac{1.544 \text{ Mb/s}}{100 \text{ Hz} \times 8,000} = 1.93 \text{ seconds}$$

Therefore, 45 degree phase shifts resulting from such slips will occur with a degree of regularity and at intervals of 1.93 seconds or longer. PCM systems having defects in them may deviate more, of course, so that a somewhat more frequent occurrence may be noted. Consequently, the frame slip detector 44 would produce an output indicating a frame slip whenever phase shifts detected within the window are repeated at periodic intervals of, for example, one second or longer.

An output from the slip detector 44 is obtained by causing the output from the phase shift detector 40 to arm the system as the signal from the detector increases in amplitude past the level corresponding to a 40 degree phase shift. If the amplitude continues to increase to a level corresponding to at least a 50 degree phase shift, the indicator is disarmed. In addition, the indicator 44 will also be disarmed if a loss of tone, or dropout, occurs, or if an excessive phase shift at an amplitude between 90 degrees and 180 degrees is detected. If the signal falls below the level corresponding to a 40 degree phase shift while the indicator is armed, a frame slip is indicated.

Although the invention has been described herein with reference to a specific embodiment, many modifications and variations therein will readily occur to those skilled in the art. Accordingly, all such variations and modifications are included within the intended scope of the invention as defined by the following claims.

We claim:

1. A frame slip detector for detecting frame slip in pulse code modulation transmission systems comprising test tone generating means for supplying, to one channel of a pulse code modulation transmission system having a plurality of channels and which transmits information in all of the channels at a selected frame transmission rate, a test tone having a frequency which is a selected ratio of the frame transmission rate of the transmission system, phase shift detection means for detecting phase shifts in said one channel of the transmission system and providing corresponding output signals, and frame slip indicator means for responding to signals corresponding to phase shifts in a selected range of angles including an angle forming the same ratio with 360 degrees as the ratio of the frequency of the test tone to the frame transmission rate of the transmission system to indicate a frame slip for each phase shift having an angle within the selected range.

2. A frame slip detector according to claim 1 wherein the frame slip indicator means includes selecting means for selecting phase shifts in response to phase shift signals which exceed a selected lower limit but do not exceed a selected upper limit.

3. A frame slip detector according to claim 1 wherein the frequency of the test tone is approximately one-eighth of the frame transmission rate of the transmission system and the frame slip indicator means includes selecting means for selecting phase shifts having a magnitude between about 40 degrees and about 50 degrees to produce corresponding frame slip indications.

4. A method for detecting frame slip in a pulse code modulation transmission system with a plurality of channels having a frame transmission rate comprising supplying to one channel of the system a test tone with a frequency which has a selected relation to the frame transmission rate of the transmission system, detecting phase shifts in signals received in said one channel of the system, selecting phase shifts having a phase angle which bears approximately the same relation to 360 degrees as the relation between the test tone frequency and the system frame transmission rate, and providing signals corresponding to the occurrence of the selected phase shifts as indications of frame slip.

5. A method according to claim 4 including selecting phase shift signals which exceed a selected minimum value but do not exceed a selected maximum value to provide indications of frame slip.

6. A method according to claim 4 in which the frame transmission rate of the information transmission system is approximately 8 KHz and the test tone frequency is approximately 1 KHz and phase shifts in a range from 40 degrees to 50 degrees are selected to provide frame slip indications.

* * * * *